US008508785B2

(12) United States Patent  (10) Patent No.: US 8,508,785 B2
Schindler, II et al.  (45) Date of Patent: Aug. 13, 2013

(54) COMPUTER IMPLEMENTED METHOD FOR GENERATING AN IMAGE ENHANCED PRODUCT BY SELECTABLE PRINTING AND FRAMING

(75) Inventors: Roland R. Schindler, II, Pittsford, NY (US); James M. Devoy, Rochester, NY (US); Megan M. Schneider, Rochester, NY (US); Kimberly B. Hajec, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1135 days.

(21) Appl. No.: 12/183,085

(22) Filed: Jul. 31, 2008

(65) Prior Publication Data
US 2010/0027071 A1    Feb. 4, 2010

(51) Int. Cl.
*G06K 15/00*    (2006.01)
(52) U.S. Cl.
USPC ........................................ 358/1.18; 358/1.12
(58) Field of Classification Search
USPC ........................................................ 358/1.18
See application file for complete search history.

(56) References Cited

U.S. PATENT DOCUMENTS

| 4,117,613 | A | 10/1978 | Hosker |
| 4,918,483 | A | 4/1990 | Otake |
| 7,010,176 | B2 * | 3/2006 | Kusunoki ..................... 382/299 |
| 2004/0223168 | A1 | 11/2004 | Haneda et al. |
| 2006/0072174 | A1 * | 4/2006 | Koike et al. .................. 358/537 |
| 2009/0196520 | A1 * | 8/2009 | Devoy et al. ................. 382/254 |
| 2011/0013230 | A1 * | 1/2011 | Devoy et al. ................ 358/1.18 |

* cited by examiner

*Primary Examiner* — Twyler Haskins
*Assistant Examiner* — Fred Guillermety
(74) *Attorney, Agent, or Firm* — Eugene I. Schkurko; Amit Singhal

(57) ABSTRACT

Methods and a system for providing an image enhanced product are provided. One method includes identifying a framing system having a holding area with positioning features that hold a masking surface that generally blocks the passage of light through the masking surface except in a plurality of window areas; determining an arrangement of a plurality of overlapping receiver mediums to provide a plurality of image receiving areas in correspondence with one of the of the window areas when a reference edge of each of the receiver mediums is located using an associated one of the positioning features; and printing images in the image receiving areas of the plurality of receiver medium sheets according to the determined arrangement; wherein said determining is performed in a manner that causes any overlapping edge between two receiver mediums to be positioned outside any of the window areas, and causes at least portions of selected images to be positioned within the window areas.

10 Claims, 21 Drawing Sheets

COMPUTER IMPLEMENTED METHOD FOR GENERATING AN IMAGE ENHANCED PRODUCT BY SELECTABLE PRINTING AND FRAMING

FIELD OF THE INVENTION

The present invention relates to the field of generating image enhanced products, and in particular the creation and production of an image enhanced framing system that hold images that are partially masked.

BACKGROUND OF THE INVENTION

Personalized image collages, clothing, albums and other image enhanced items are becoming increasingly more accessible at the retail level as printing and digital technologies improve and drop in cost. However, as the ability to deliver a personalized image bearing product has become more accessible, the novelty and perceived value of such gifts has diminished. Accordingly consumers have become more discriminating and seek items that bear customized images in a more seamless and integrated manner. However, few consumers are equipped with the combination of artistic, aesthetic, and technical gifts necessary to successfully master such items. Those that do often lack the time necessary to do this task effectively.

Of particular interest to many consumers are the difficulties that are associated with arranging images within a plurality of window openings in a framing and masking system combination. Typically, this process involves arranging individual images such as conventional 4 1"×6" photographs behind the windows in the masking system, such as a matte, and then securing each individual image to the masking system in the arranged fashion. It will be appreciated that this is a difficult and time-consuming task. Further, it will be appreciated that this conventional approach is difficult to use with certain artistic styles wherein certain windows of a matte are used to present different portions of the same image or other artistic styles wherein it is desired to provide images in a plurality of the window areas of the mattes that have consistent image characteristics such as of image scale, image tone, image color characteristics and/or other characteristics. The conventional approach further creates difficulties in providing uniform alignment of images from window to window such as where, for example, it is desired to provide images that are arranged in a nonlinear or curvilinear or other patterned arrangements. Further it will be appreciated that not all masks provide windows that are sized and/or shaped in a manner that is consistent with the size and shape of a portion of a printed image that the consumer wishes to place in the window.

In yet another related art, it is known to provide consumers with tools to enable creation of electronic scrapbooking or album pages. Where this is done, consumers are provided with the ability to generate a digital canvas upon which the consumers can impose background imagery, colors, or other visual effects, and upon which they can place individual images in any of a wide variety of forms. However, such digital systems are not typically adapted for use with actual masking or matting systems. In particular, such digital systems operate from a presumption that a generated album page can be recorded using a single receiver medium. Thus the diversity of framing systems that are available to a user are inherently limited by the receiver mediums on which the album pages can be recorded. Such receiver mediums typically dictate a limit on the size, shape, and/or aspect ratio arrangement for all of the digital canvases that can be used by the electronic scrapbooking or album mastering software. Where such electronic scrapbooking or album mastering software is used to generate receiver mediums for use in a framing and masking system that has a size and/or aspect ratio that does not correspond to the size, shape, and/or aspect ratio of the available receiver mediums, a user is left with the challenges of manually attaching the printed receiver mediums to the masking system as discussed above.

Accordingly, what is needed in the art is a system that creates arrangements of images that can be printed on available receiver mediums so that the printed receiver mediums can easily be positioned in registration with arrangements of window areas of a masking system that is held within a known framing system.

SUMMARY OF THE INVENTION

Methods and a system for providing an image enhanced product are provided. One method includes identifying a framing system having a light transmissive area to allow light to enter and exit a holding area wherein the holding area has a plurality of positioning features adapted to hold a masking surface in registration with the light transmissive area, with said masking surface generally blocking the passage of light through the masking surface except in at least two window areas that are generally light transmissive; determining an arrangement of a plurality of overlapping receiver mediums to provide a plurality of image receiving areas that are each positioned in correspondence with one of the at least two window areas when a reference edge of each of the receiver mediums is located using an associated one of the positioning features; and printing images in the image receiving areas of the plurality of receiver mediums according to the determined arrangement; wherein said step of determining is performed in a manner that causes any overlapping edge between any two of the plurality of overlapping receiver mediums to be positioned outside of the at least two window areas of the masking surface, and at least one of the selected images to be positioned within each of the at least two window areas when each of the plurality of receiver mediums is placed underneath the masking surface with the respective reference edge of each respective one of the plurality of receiver mediums being positioned relative to the positioning feature that is associated therewith.

BRIEF DESCRIPTION OF THE DRAWINGS

The above-mentioned and other features and objects of this invention and the manner of attaining them will become more apparent and the invention itself will be better understood by reference to the following description of embodiments of the invention taken in conjunction with the accompanying figures wherein.

DETAILED DESCRIPTION OF THE INVENTION

Like numbers are used thought the application for reference to like parts in all Figures.

Figure 1:
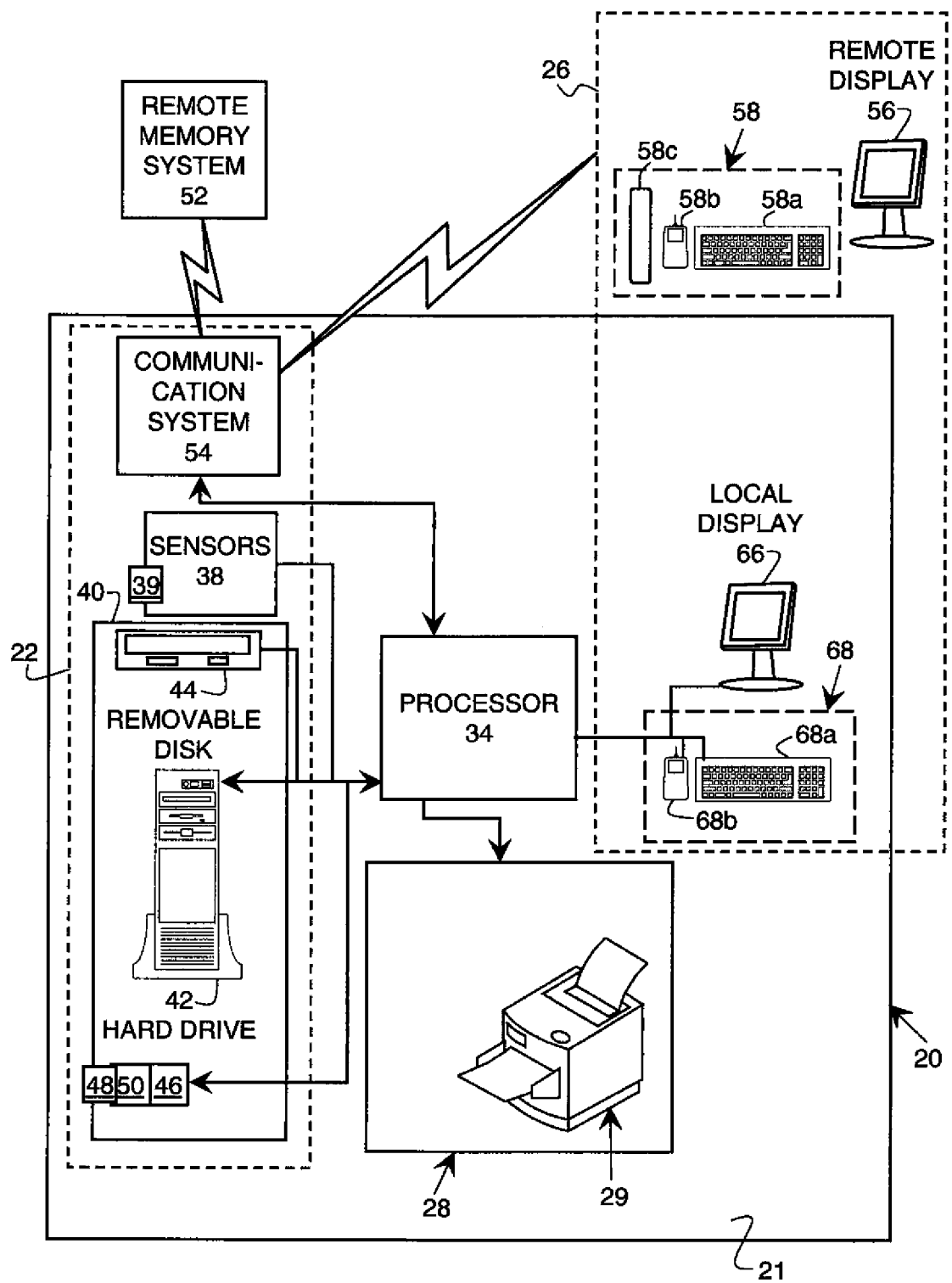
FIG. 1 shows an embodiment of a printing system.

FIG. 1 illustrates a first embodiment of an electronic system 20 for generating an output product. In the embodiment of FIG. 1, electronic system 20 comprises a housing 21 and a source of content data files 22, a user input system 26 and an output system 28 connected to a processor 34. One or more of source of content data files 22, user input system 26 or output system 28 and processor 34 can be located within housing 21 as illustrated. In other embodiments, circuits and systems of one or more of source of content data files 22, user input system 26, or output system 28 can be located in whole or in part outside of housing 21.

Source of content data files 22 can include any form of electronic or other circuit or system that can supply digital data to processor 34. The content data files can comprise any form of digital data including, for example, and without limitation, data representing still images, image sequences, graphic, text, signs, symbols, and/or video graphics that can be used as at least a part of a basis for generating an output. Source of content data files 22 can capture content data for use in content data files by use of capture devices located at electronic system 20 and/or can obtain content data files that have been prepared by or using other devices. In the embodiment of FIG. 1, source of content data files 22 includes sensors 38, a memory 40 and a communication system 54.

Sensors 38 are optional and can include light sensors, biometric sensors, and other sensors known in the art that can be used to detect conditions in the environment of system 20 and to convert this information into a form that can be used by processor 34 of system 20. Sensors 38 can also include audio sensors 39 that are adapted to capture sounds made by a user of system 20 such as verbal commands or dictation. Sensors 38 can also include biometric or other sensors for measuring involuntary physical and mental reactions, such sensors including but not limited to voice inflection, body movement, eye movement, pupil dilation, and body temperature sensors.

Memory 40 can include conventional memory devices including solid state, magnetic, optical, or other data storage devices. Memory 40 can be fixed within system 20 or it can be removable. In the embodiment of FIG. 1, memory 40 is shown having a hard drive 42, a disk drive 44 for a removable disk such as an optical, magnetic or other disk memory (not shown), and a memory card slot 46 that holds a removable memory 48 such as a removable memory card and has a removable memory interface 50 for communicating with removable memory 48. Data including but not limited to control programs, digital images, and metadata can also be stored in a remote memory system 52 such as a personal computer, computer network, or other digital system.

In the embodiment shown in FIG. 1, system 20 has a communication system 54 that, in this embodiment, can be used to communicate with a remote memory system 52, a remote display 56, and remote input 58. A remote input station can thus be provided including a remote input display 56 and/or remote input controls 58, wherein the remote input station can communicate with communication system 54 wirelessly as illustrated or can communicate in a wired fashion. In the embodiment illustrated in FIG. 1, a local input station including either or both of a local display 66 and local input controls 68 (also referred to herein as "local user input 68") is connected to processor 34 directly. However, in other embodiments (not shown), such a local input station can be connected to communication system 54 using a wired or wireless connection.

Communication system 54 can comprise for example, one or more optical, radio frequency, or other transducer circuits or other systems that convert image and other data into a form that can be conveyed to a remote device such as remote memory system 52 or remote display device 56 using an optical signal, radio frequency signal, or other form of signal. Communication system 54 can also be used to receive a digital image and other data from a host or server computer or network (not shown), a remote memory system 52, or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet; a cellular, peer-to-peer or other form of mobile telecommunication network; a local communication network such as wired or wireless local area network; or any other conventional wired or wireless data transfer system.

User input system 26 provides a way for a user of system 20 to provide instructions to processor 34. This allows such a user to make a designation of content data files to be used in generating an output product and to select an output form for the output product. User input system 26 can also be used for a variety of other purposes including but not limited to allowing a user to arrange, organize, and edit content data files to be incorporated into the output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system, a keyboard, a remote control, or other such systems. In the embodiment shown in FIG. 1, user input system 26 includes an optional remote input 58 including a remote keyboard 58a, a remote mouse 58b, and a remote control 58c, and a local input 68 including a local keyboard 68a and a local mouse 68b. Remote input 58 can take a variety of forms, including but not limited to any combination of the remote keyboard 58a, remote mouse 58b, or remote control handheld device 58c illustrated in FIG. 1. Similarly, local input 68 can take a variety of forms.

Figure 2:
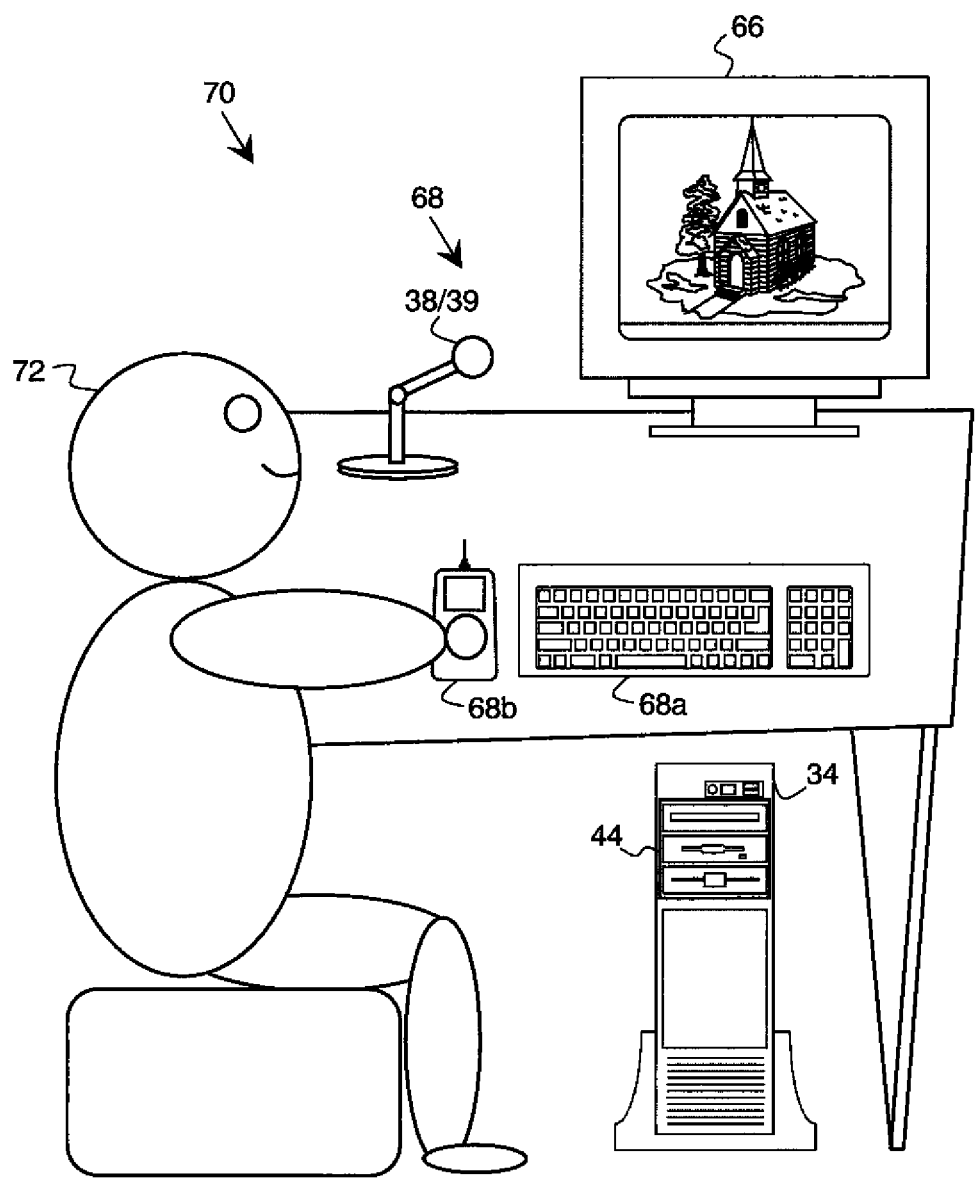
FIG. 2 shows an embodiment of a work station or kiosk that can be used by the system of FIG. 1.

As is illustrated in FIG. 2, local user input 68 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 2, editing area 70 can also have sensors 38 including but not limited to cameras, audio sensors 39, and other sensors such as multi-spectral sensors that can monitor user 72 during a production session.

Output system 28 (FIG. 1) is used for rendering images, text or other graphical representations in a manner that allows an image-enhanceable item to be converted into an image-enhanced product. In this regard, output system 28 can comprise any conventional structure or system that is known for printing or recording images, including but not limited to a printer 29. For example, in other embodiments, output system 28 can include a plurality of printers 29 (not shown), wherein processor 34 is capable of printing to a plurality of printers or a network of printers. Each printer of the plurality of printers can be of the same or a different type of printer than at least one other of the plurality of printers, and each printer can produce prints of the same or a different format from others of the plurality of printers. Printer 29 can record images on receiver medium using a variety of known technologies including, but not limited to, conventional four color offset separation printing or other contact printing, silk screening, dry electro-photography such as is used in the NexPress 2100 printer sold by Eastman Kodak Company, Rochester, N.Y., USA, thermal printing technology, drop on demand ink jet technology, and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. It will be appreciated that in certain embodiments source of content data files 22, user input system 26, and output system 28 can share components.

Processor 34 operates system 20 based upon signals from user input system 26, sensors 38, memory 40, and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 3:
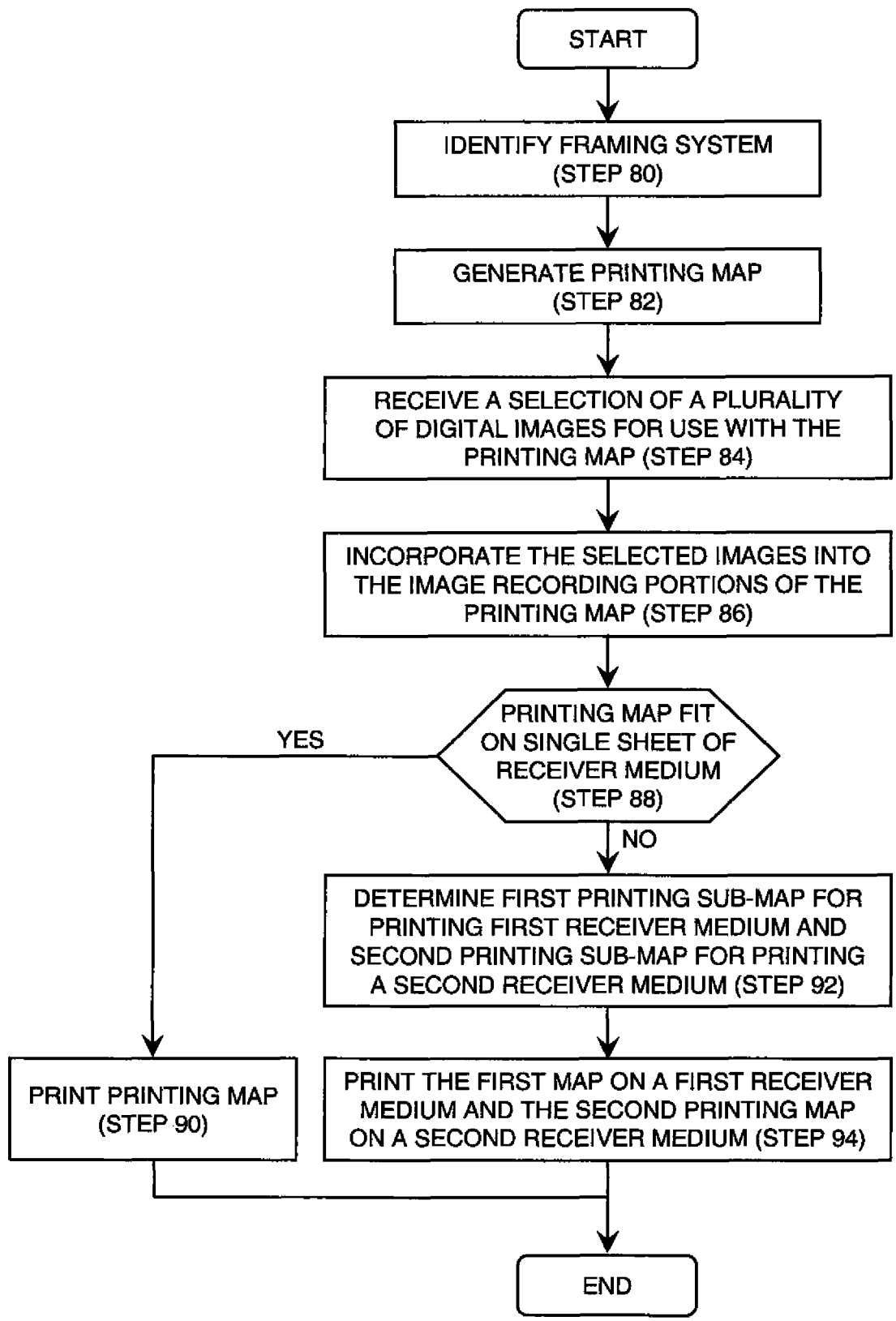
FIG. 3 shows a first embodiment of a printing method.

FIG. 3 shows a first embodiment of a printing method that can be executed, for example, by the printing system 20 of FIGS. 1 and 2. In the embodiment that is shown in FIG. 3, a first step of the method includes identifying a framing system that has a structural frame with positioning features to position a masking system in registration with a light transmissive area of the structural frame (step 80). The masking system defines a plurality of light transmissive windows that allow light to pass through the masking system to the image receiver medium and an inter-window masking region between the windows that block the passage of light through the masking system.

In general, a framing system can include any structure that can position a receiver medium on which images can be formed, located, placed, or otherwise provided in registration with a masking system that masks portions of the receiver medium such that light cannot effectively travel through the masking system except through the plurality of windows, and position features to help position the receiver medium and masking system in registration. In this regard, it will be appreciated that a framing system can take the form of a wide variety of objects including, without limitation, any of a collage, photo book, scrap book, photo calendar, mug, stein, cup, stemware, jewelry, tile, mosaic, home décor, mouse pads, pillowcases, pen and/or pencil holders, a photo-realistic image on a canvas, a keepsake box, a fleece blanket, coasters, frame, ornament, playing cards, puzzle, teddy bear or other stuffed animal, wall paper, packaging, apparel and accessories, including but not limited to a T-shirt, a tie, a tote bag, apron, baby onesie, or performance shirt, mailing labels, gift tags, or any other tangible thing that can be designed to position a masking surface and receiver medium in registration.

Figure 4A:
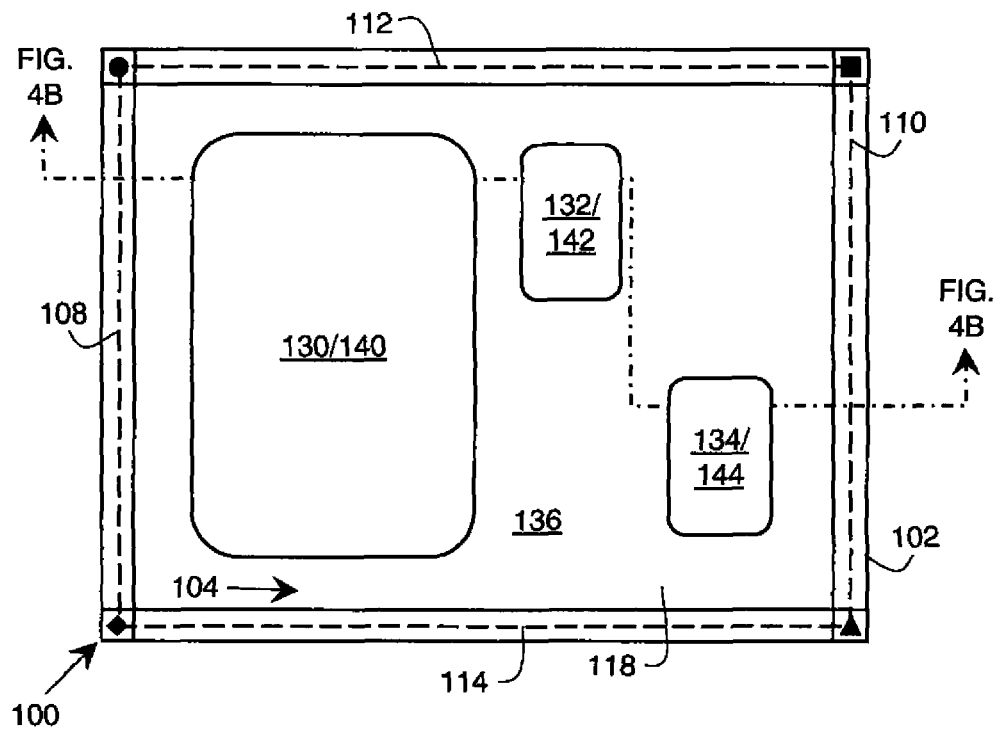
FIGS. 4A and 4B show, respectively, a top view and a section elevation view of one example of a framing system.
Figure 4B:
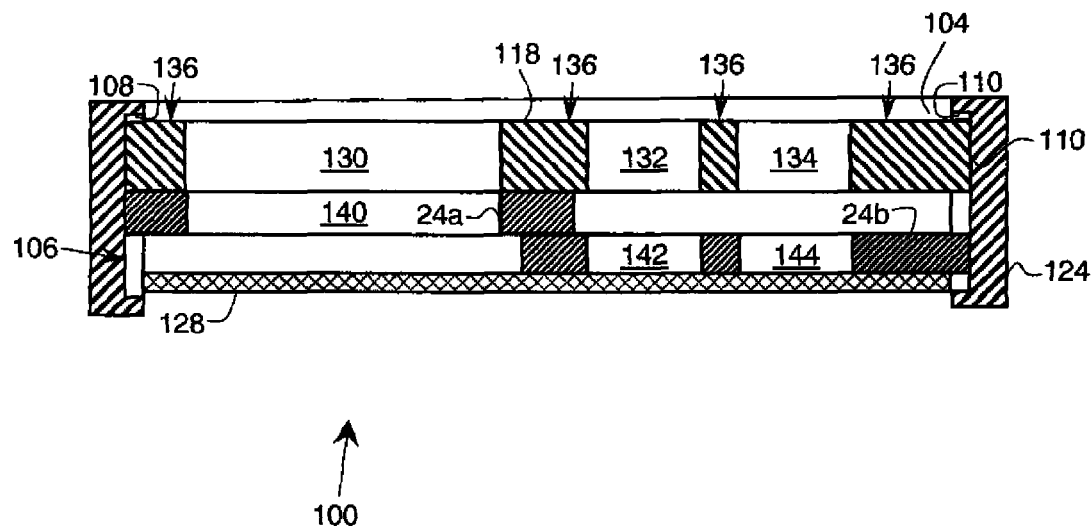

FIGS. 4A and 4B show, respectively, a top view and a section elevation view of one, non-limiting example of a framing system 100. As is shown collectively in FIGS. 4A and 4B, in this embodiment, framing system 100 comprises an external structural frame 102, with a light transmissive area 104 and an internal area 106 that has positioning features comprising, in this embodiment, a perimeter of edges 108, 110, 112 and 114 that are adapted to position a masking system 118 and overlapping receiver mediums 24a and 24b so that masking system 118 and overlapping receiver mediums 24a and 24b can be held in registration in internal area 106. It will be appreciated that the thicknesses that are illustrated for masking system 118 and receiver mediums 24a and 24b in FIG. 4B are not to scale and are offered only for the purposes of enhancing the clarity of the present discussion. It will also be appreciated that, in other embodiments, the positioning features can take any conventional technology known for holding a sheet of receiver medium. Further, it will be appreciated that two or more receiver mediums can be used.

In the embodiment of FIGS. 4A and 4B, masking system 118 defines a plurality of windows 130, 132, and 134 that allow light to pass through masking system 118 so that portions 140, 142, and 144 of receiver mediums 24a and 24b that are registered with windows 130, 132, and 134 can be seen outside of framing system 100 while other portions of receiver mediums 24a and 24b are blocked from view by inter-window masking region 136 of masking system 118.

Windows 130, 132, and 134 can be essentially transparent and can optionally comprise openings through masking system 118. However, it will be appreciated that in various embodiments, windows 130, 132, and 134 can comprise light transmissive materials such as transparent or semi-transparent materials that allow light to pass therethrough in a modified form. For example, one or more of windows 130, 132, and 134 can filter, soften, selectively block, or redirect portions of light passing therethrough as may be desired. In certain embodiments, liquid crystal or other selectively light blocking materials can be used as a semi-transparent material in any one of windows 130, 132, and 134. Such filtering, softening, and/or selective blocking can be performed for artistic or aesthetic purposes, while in the same or other embodiments, such filtering, softening, or selective light blocking can be protective such as where the blocked light is of a type that can damage masking system 118 or receiver medium 24 or damage images that are recorded thereon.

In one example, ambient or other light that passes through light transmissive area 104 travels onto masking system 118 or onto one of receiver mediums 24a and 24b. This light is reflectively modulated by images 140, 142 and 144 or by inter-window areas 136 of masking system 118 and returns through light transmissive area 104 so that the modulated light is viewable outside of framing system 100. In this regard, light transmissive area 104 can comprise, for example and without limitation, an opening between an observer and framing system 100 and receiver mediums 24a and 24b. Alternatively, light transmissive area 104 can comprise a light transmissive material including without limitation any of the above described light transmissive materials.

In the embodiment of FIGS. 4A and 4B, internal area 106 is also sized and shaped to hold an optional backing support 128, which can have, for example, mounting structures (not shown) such as hook mountings and the like defined therein. In other embodiments, internal area 106 can optionally be sized to hold a protection layer such as a glass or other transparent or semitransparent sheet (not shown) of conventional design to protect and/or hold masking system 118 and receiver medium 24. The protection layer can be the same as or different from light transmissive area 104.

Figure 5:
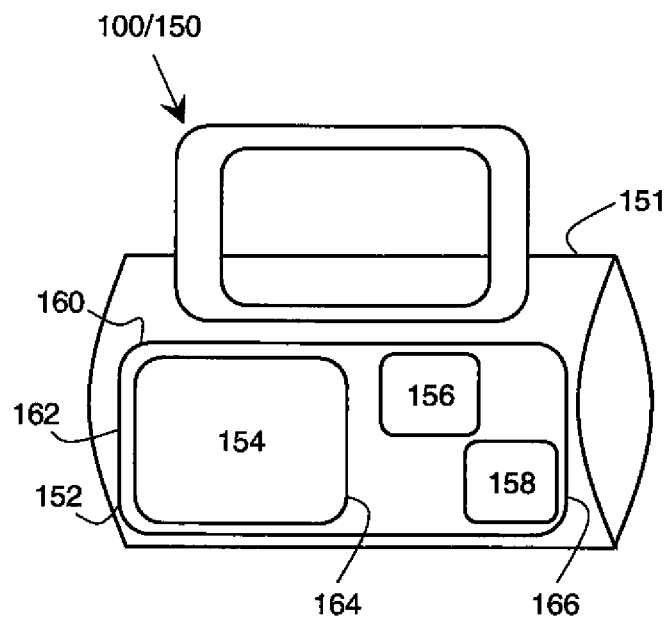
FIG. 5 illustrates yet another example of a framing system.

FIG. 5 illustrates yet another example of a framing system 100 comprising a conventional tote bag 150 having a substrate 151 such as a structural exterior fabric of bag 150 and a masking system 152 attached thereto or formed integrally therewith to form a pocket area. The pocket area can be, as illustrated in FIG. 5, a three side positioning feature provided at attachment stitches 160, 162, and 164 against which a receiver medium can be positioned and an unstitched section 166 through which a receiver medium 24 can be inserted. Window areas 154, 156, and 158 allow light to travel to and from any receiver medium positioned within the pocket area. The pocket area can be any size or shape. The pocket area can be attached by adhesion, stitching, staples, rivets, or any other fastening means. At least one side of the pocket area can be openable to receive insertion of the receiver medium. The opening can be covered by a flap, or can be closeable by some fastening means, wherein the fastening means can be permanently closed after a receiver medium is inserted, or can be openably closed, such that the receiver medium can be replaced with an alternate receiver medium as desired.

Returning now to FIG. 3, it will be appreciated that for step 80, a framing system 100 can be identified based upon a selection made by user 72. Typically, this user selection of a framing system 100 is received from a user input system 26 that detects when user 72 has made a user input action and generates a signal that can be interpreted by processor 34 as a selection of one of a plurality of framing systems. Such a manual input from a user can also be received in other manners known to those of skill in the art, including, but not limited, to receiving such input by way of communication system 54.

Alternatively, framing system 100 can be identified based upon stored information regarding user 72 or some other person, wherein the stored information can include, but is not limited to, user preferences, past user interactions and other factors. It will be appreciated that such an identification can be made automatically, when, for example, it is determined that system 20 is optimized or otherwise configured for use with only one type of framing system 100.

In certain embodiments, framing system 100 can be identified by reading printed information or information that is otherwise recorded in association with the framing system 100 including, but not limited to, text data, images, patterns, shapes, or the like. For example, most goods are associated with identifiers such as bar codes, watermarks, text, codes and/or radio frequency identifiers that uniquely identify the good being sold. Where framing system 100 is associated with such identifiers, a user input 26 can include an appropriate reader of conventional design to which framing system 100 can be presented so that the identifier can be read. Alternatively, a user can enter an identifier into user input system 26 manually.

A printing map is then generated for printing images for use in the identified framing system 100 (step 82). The printing map defines a plurality of image receiving portions that correspond to the light transmissive window areas of the masking system 118. For the purposes of this discussion, it is assumed that framing system 100 has a masking system 118 that is associated uniquely therewith. However, it will be appreciated that this is not critical and that in certain embodiments the step of identifying the framing system (step 82) can also include separately identifying a masking system 118 for use in the framing system. Such separate identification can be made using the techniques used to identify framing system 100 or using any conventional technique know for identifying a mask, a matting system, or a document.

The printing map defines an arrangement of the image recording portions such that when images are printed on receiver medium 24 in accordance with the printing map, the arrangement of image receiving portions corresponds with the arrangement of windows of masking surface 118 that allow light to travel to and from receiver medium 24. In this embodiment, each image receiving portion is defined at least by a shape and location information defining a location of the image receiving area on receiver medium 24.

The image receiving portion shape can be defined by reference to well known geometric constructs, mathematical algorithms, or in any other form or manner of defining a shape known in the art of image processing, geometry, computer science and/or other relevant arts. The image receiving portion can also be a free form, whimsical, or natural shape, such as a shell, animal, vegetable, or other natural feature.

The location information defines, in some manner, a location or position on a receiver medium 24 on which at least one image receiving portion shape is to be defined. The location information can be located in any known fashion. For example and without limitation, the location information can define a location of an image receiving portion shape relative to a positioning feature of framing system 100, based upon predetermined characteristics of framing system 100 such as edge locations, and/or borders or any other clamping or holding structures of framing system 100, or it can define the location of the window shape relative to predetermined characteristics of receiver medium 24, such as perforations, edge location, water marks, fiducials, or other reference structures, markers, printed text, printed images, seam locations, fabric patterns, or other visible or tactile features on receiver medium 24. In another non-limiting example, the location information can define a location for the window based upon the location of other surfaces that are joined to receiver medium 24.

In other embodiments, system 20 can have a user input system 26 that incorporates an image input source such as a scanner or image capture device of conventional design that can be arranged to capture an image of framing system 100. This image can be examined to determine an identifier for framing system 100 that can then be used for example in the manner that is discussed above to identify the framing system 100 or masking system 118 in sufficient detail to permit determination of a printing map. In situations where framing system 100 includes a masking system 118 into which receiver medium 24 is to be placed, this image can be analyzed to determine the printing map through well known image analysis techniques.

A selection of images for use with the printing map is then received (step 84). This can occur in any number of conventional fashions. For example and without limitation, where a user 72 of system 20 has digital images such as user captured images or stock images that are stored in a memory that is integral to system 20 or that can be connected to system 20 such as a memory card, user 72 can use user input system 26 to identify which of the digital images are to be used in the printing map. Alternatively, user 72 of system 20 can use user input system 26 to cause system 20 to reference externally stored data bases of images for use in the printing map.

In one embodiment, the steps of determining a printing map (step 82) and receiving a selection of a plurality of digital images (step 84) can be combined. In one non-limiting example of this type, a user 72 can be presented with a template, drawing or other visual representation of a printing map onto which the user can drag and drop or otherwise place and optionally size selected images in order to provide a defined arrangement of images relative to the image receiving portions defined by the printing map. The received images are then incorporated into the plurality of image recording portions of the printing map (step 86). In an alternate embodiment, the user 72 can select images, and the printing map can be auto-generated based on the number of images and/or the orientation of images selected by the user.

It is then determined whether the printer 29 to be used in printing the printing map can record the entire printing map using a single receiver medium 24 (step 88). Typically this determination can be made based upon whether a single receiver medium 24 is as large as the printing map or is shaped in manner that allows the entire printing map to be recorded therein. As shown in FIG. 3, in a circumstance where processor 34 determines that the entire printing map can be recorded using a single receiver medium 24, then the process proceeds to step 90 wherein the printing map is used to record one or more image on a receiver medium 24.

However, where it is determined that the printer 29 or a plurality of printers 29 is available in output system 28 to be used in printing the printing map cannot record the entire printing map using a single receiver medium 24, processor 34 will generate a printing sub-map for recording a first portion of the printing map on a first receiver medium 24a and a second printing sub-map for recording a second portion of the printing map on a second receiver medium 24b. The first printing sub-map and the second printing sub-map are generated such that when the first receiver medium 24a and second receiver medium 24b are printed in accordance therewith, and when the first receiver medium 24a and the second receiver medium 24b are held in the framing system in an overlapping manner, each of the image receiving portions are positioned for viewing through one of the widow areas and an overlapping edge between first receiver medium 24a and second receiver medium 24b is positioned to be masked or covered by inter-window area 136 of masking system 118. The division of the printing map into multiple printing sub-maps can be performed in any number of conventional fashions. In one non-limiting example geometric templates depicting a size and shape of available receiver mediums can be virtually mapped within the printing map in various iterations until a combination of printing sub-maps that meet the above described requirements is achieved. Alternatively, in another non-limiting example, each masking system or framing system can be associated in memory 40 or remote memory 52 with data from which an appropriate printing sub-map can be determined. It is noted that the use of sub-maps can use any number of two or more receiver mediums, but typically no more receiver mediums than the number of images in the printing map.

Figure 6A:
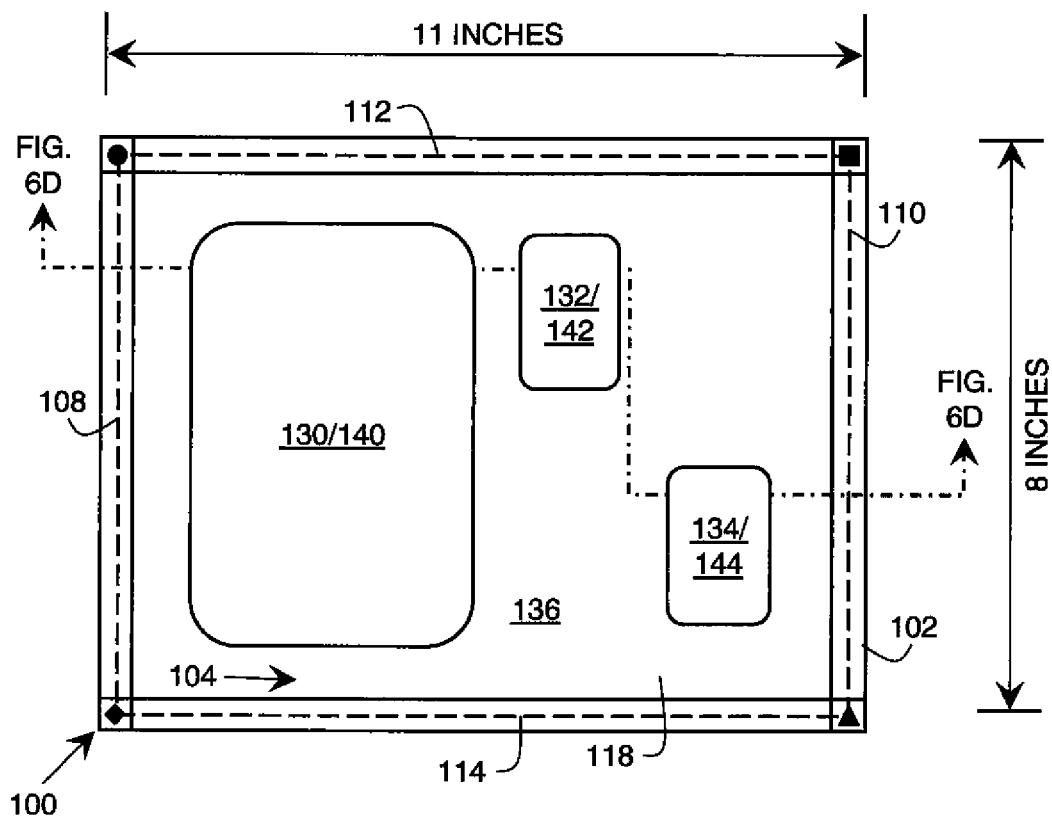
FIGS. 6A and 6B show, respectively, a top view and section view of an example embodiment with framing system, masking system, and receiver mediums of exemplary sizes.
Figure 6B:
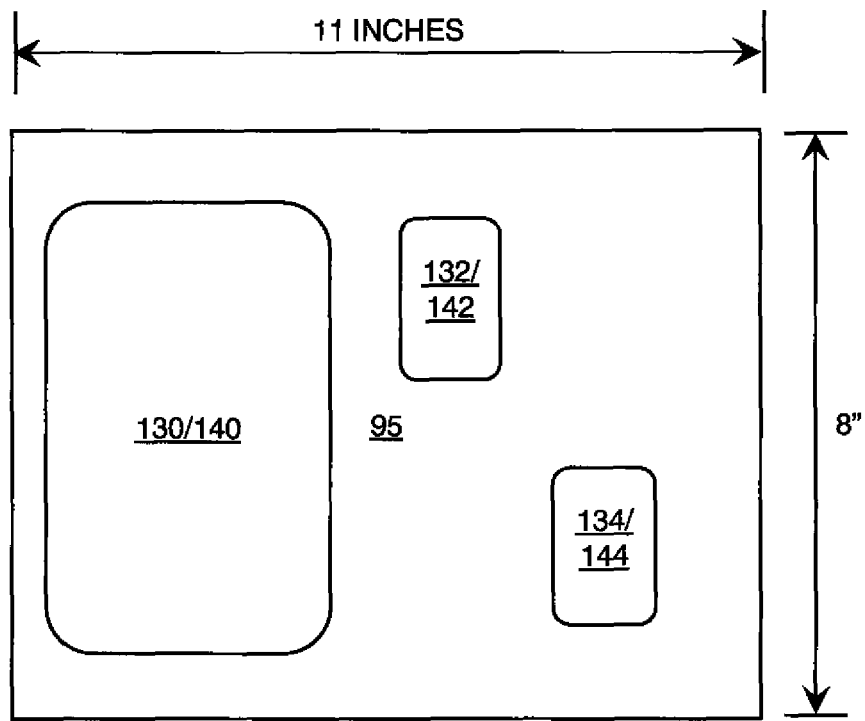

An example of multiple printing map solutions is shown in FIG. 6A. In this example, it is assumed that printing system 28 of system 20 renders printed images on a first receiver medium 24a and a second receiver medium 24b that are 6 inches wide by 8 inches high. However, in this example, a framing system 100 of the type that is illustrated in FIGS. 4A and 4B has a size that is, for the purpose of this example, large enough to hold a receiver medium 24 that is 11 inches wide and 8 inches high in area 106. In this example, framing and masking system 100 is shown as having a masking system 118 that is approximately 11 inches wide and 8 inches high, and processor 34 generates a printing map 95 for use with a framing system 100 that is also sized to be 11 inches wide and 8 inches high. An example of such a printing map is illustrated in FIG. 6B.

Figure 6C:
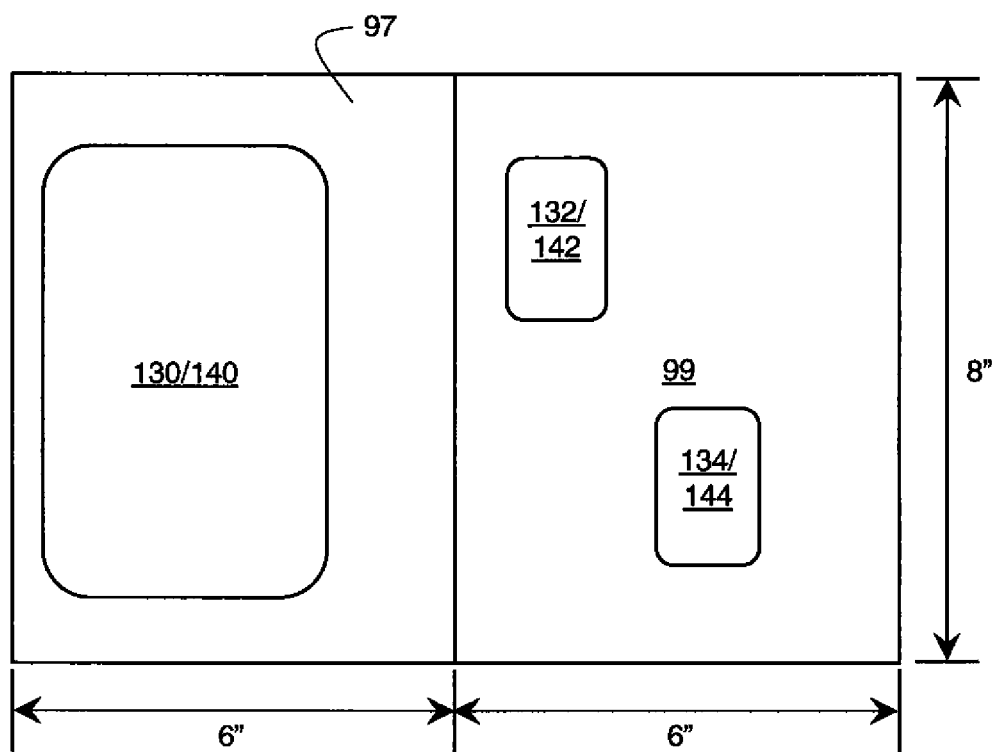
FIG. 6C illustrates a first printing sub-map and second printing sub-map for use in printing a first receiver medium and second receiver medium for use with the example of FIGS. 6A and 6B.

Under these circumstances, processor 34 will determine in step 90 that the printing map cannot record using a single receiver medium of one or more available sizes. Accordingly it is necessary to use an overlapping combination of a first receiver medium 24a and a second receiver medium 24b. Accordingly, as is illustrated in FIG. 6C, processor 34 will determine a first printing sub-map 97 for recording a first portion of the printing map 95 of FIG. 6B using first receiver medium 24a and a second printing sub-map 99 for recording a second portion of printing map 95 of FIG. 6B using a second receiver medium 24b (step 94).

Figure 6D:
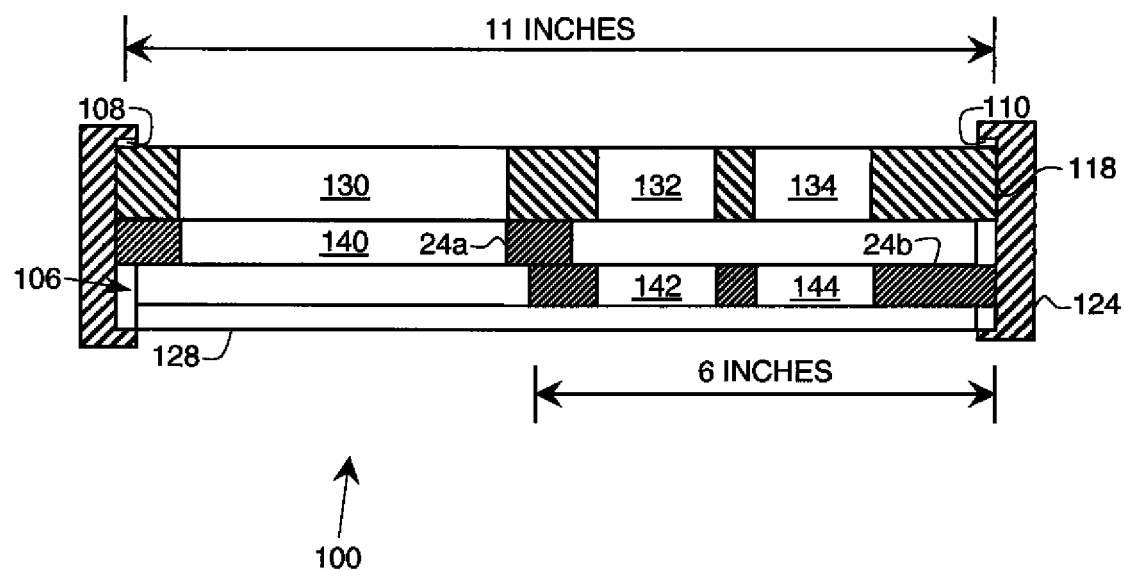
FIG. 6D illustrates a cross-section view of an assembled framing system, masking system, and combination of receiver mediums having a first printing sub-map and a second printing sub-map that are recorded on respective receiver mediums in a manner that causes an overlapping edge between the receiver mediums to be positioned so that it is masked by an inter-window area.

FIG. 6D illustrates a cross-section view of an assembled combination of framing system 100, masking system 118, first receiver medium 24a, and second receiver medium 24b. It will be appreciated that the appearance of this combination depends in large part upon the extent to which the images that are recorded on the overlapping sheets of receiver medium 24a and 24b appear to be recorded on a unitary receiver medium and therefore appear in this assembled combination without any overlapping edge of a receiver medium 24 being viewable within one of the plurality of windows of masking system 118. In this example, the effect is achieved by arranging the overlapping edges of first receiver medium 24a and second receiver medium 24b under and thus concealed by mask 118.

Figure 7A:
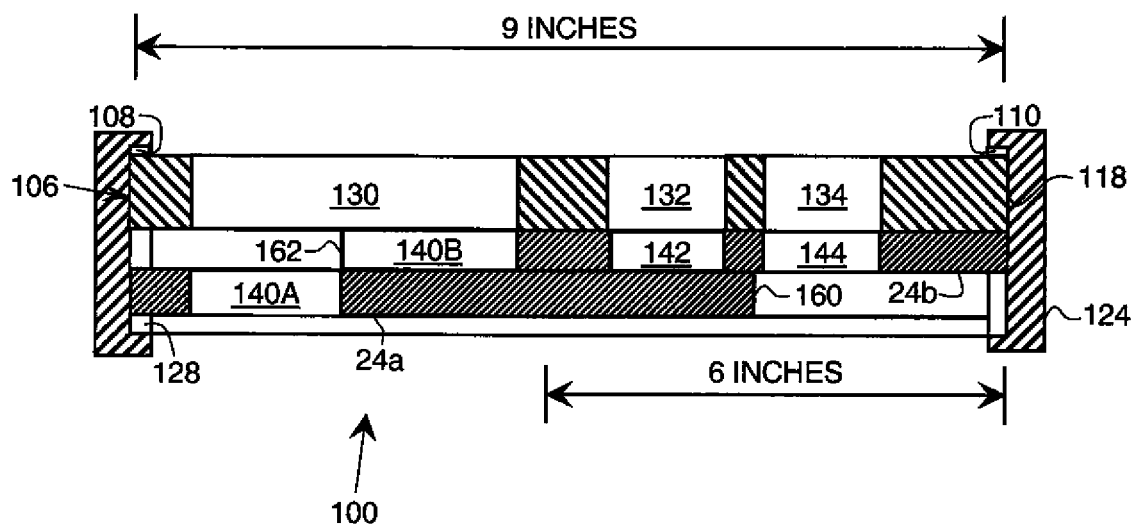
FIGS. 7A and 7B illustrate an example of what can occur when an overlapping edge is permitted to appear in a window area of a masking system.
Figure 7B:
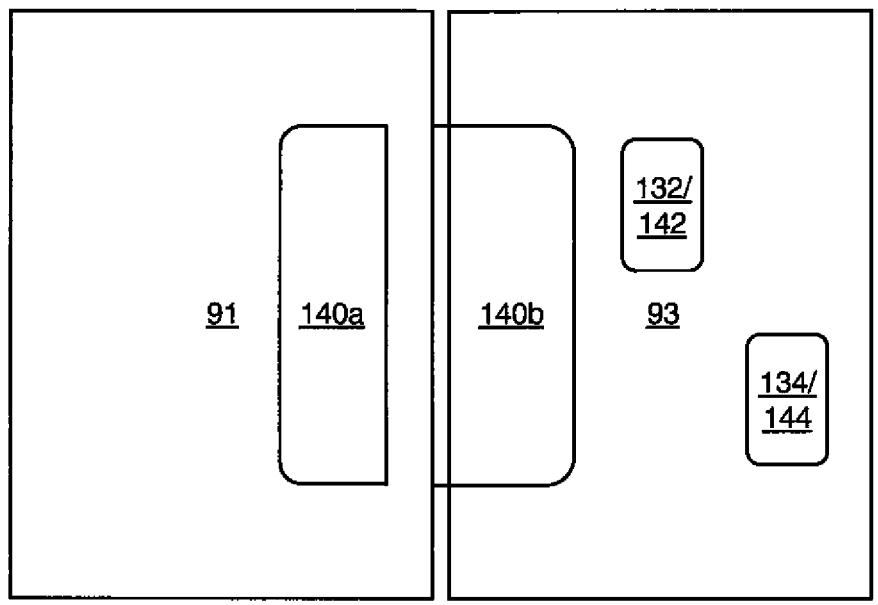

FIGS. 7A and 7B illustrate an example of what can occur when an overlapping edge is permitted to appear in a window area of a masking system 118. For convenience, this example uses the embodiment of framing system 100 of FIGS. 4A and 4B that is sized to be 11 inches wide and 8 inches high and that is used in a situation wherein receiver medium sheets 24a and 24b are still 6 inches wide but in which the width of masking system 118 is reduced to 9 inches. This example illustrates one possible arrangement of a first printing sub-map 170 and a second printing sub-map 172 used with a first receiver medium 24a and a second receiver medium 24b respectively within framing system 100.

In the arrangement of FIGS. 7A and 7B first receiver medium sheet 24a is located beneath second receiver medium 24b. As is shown in this embodiment, this arrangement causes an overlapping edge 162 of second receiver medium 24b to be located in window 130. Accordingly, image 140 must be broken into two parts, image 140A which is printed on a first receiver medium and a second part, image 140B which is mapped along with images 142 and 144 on a second receiver medium 24b. As can be seen in FIGS. 7A and 7B, where this is allowed to occur, overlapping edge 162 is clearly visible within window 130. This creates an image artifact that is unacceptable.

As noted above, with reference to FIGS. 6A-6D, to avoid the outcome illustrated in FIGS. 7A and 7B, processor 34 generates the first printing sub-map and second printing sub-map so that they are recorded on receiver mediums 24a and 24b in a manner that causes an overlapping edge between the receiver mediums 24a and 24b to be positioned so that it is masked by inter-window area 136 of masking system 118. Further, as will be discussed below, such printing is done assuming that each receiver medium will be positioned with reference to at least one of a plurality of positioning features in area 106 of framing system 100.

Figure 8A:
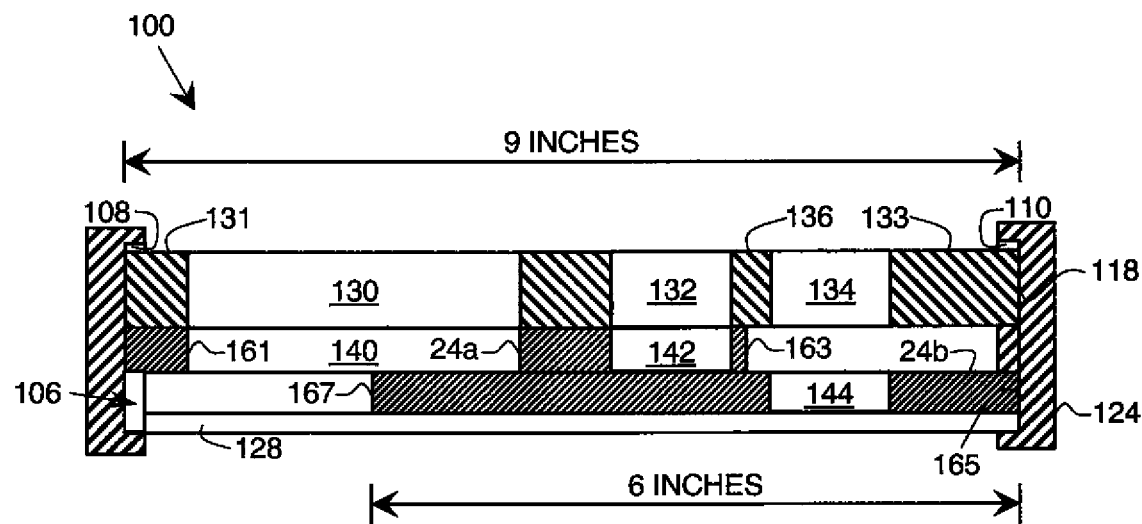
FIGS. 8A and 8B illustrate a framing system arranged in accordance with one embodiment of the invention.
Figure 8B:
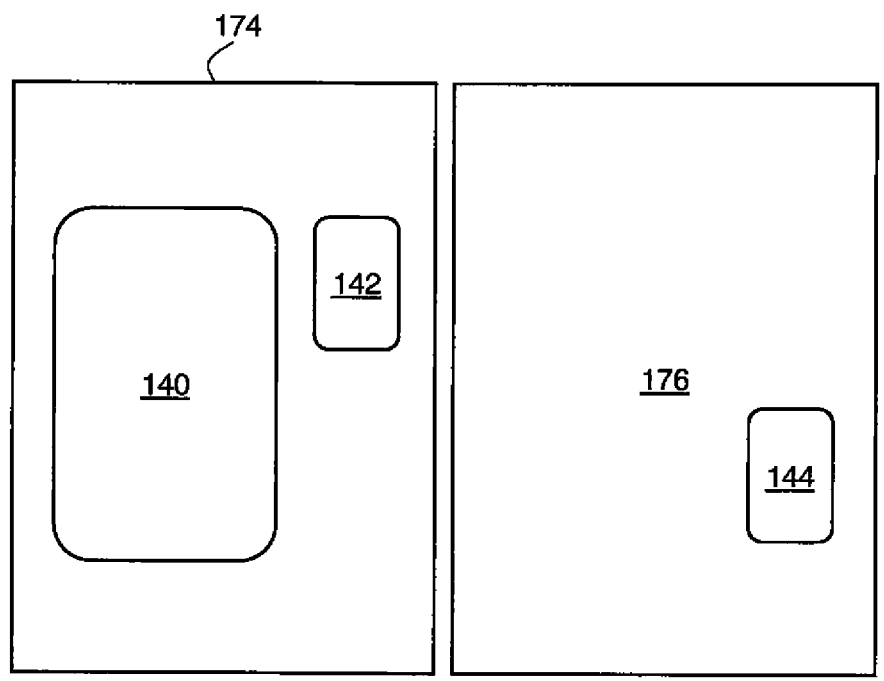

The preferred arrangement of two or more receiver mediums is shown in FIGS. 8A and 8B, which illustrate a framing system 100 having the same masking system 118, and receiver medium 24, discussed with respect to FIGS. 7A and 7B. As is illustrated here, processor 34 determines a first printing sub-map and a second printing sub-map assuming that second receiver medium 24b will be positioned below first receiver medium 24a. Processor 34 then generates a first printing sub-map 174 that positions images 140 and 142 on first receiver medium 24a and a second printing sub-map 176 that positions image 144 on second receiver medium 24b. In this example, processor 34 determines the first printing sub-map 174 such that when a reference edge 161 of first receiver medium 24a is positioned against a first positioning feature 108 in area 106 of framing system, an overlapping edge 163 of first receiver medium 24a that overlaps second receiver medium 24b is positioned under an inter-window area 136 of masking system 118 and thus is substantially less apparent or substantially invisible because it is masked by inter-window area 136. In this example, processor 34 further determines the first printing sub-map on the assumption that reference edge 161 of first receiver medium 24a and an edge 131 of masking system 130 will be positioned against positioning feature 108 so that images 140 and 142 will align with windows 130 and 132 of masking system 118.

As is also shown in FIGS. 8A and 8B, second printing sub-map 176 is defined such that when a reference edge 165 of receiver medium 24b is positioned against a second, different, positioning feature 110 in area 106, image 144 is positioned properly for viewing through window 134. Further, an under-lapping edge 167 of second receiver medium 24b is positioned under first receiver medium 24a and is thus masked by first receiver medium 24a and, therefore, is not viewable through window 130.

This result has acceptable appearance. Thus when arranged in this manner, it becomes possible to provide a combination frame system 100 and masking system 118 with a plurality of receiver medium sheets 24a, 24b et seq. that can be arranged therein to have the effective appearance of a single sheet of receiver medium 24 having a size or aspect ratio that does not correspond to an available receiver medium sheet size.

Accordingly, in this example, processor 34 determines the first printing sub-map 174 and second printing sub-map 176 such that they cause the first receiver medium sheet 24a and the second receiver medium sheet 24b to be printed with reference to positioning features in the framing system 100. This is done to allow first receiver medium sheet 24a and second receiver medium sheet 24b to be positioned with reference to masking system 130 and with reference to each other simply by placing a positioning feature (161, 165) of receiver mediums 24a and 24b against positioning features that were used as a referenced in determining the printing sub-maps (108, 110). Typically, different receiver mediums will be printed with reference to different ones of the positioning features of framing system 100 in that multiple receiver mediums will often be used, for example, where an individual receiver medium cannot extend across an axis of an entire light transmissive area 104 of framing system 100. This greatly facilitates the task of positioning receiver medium sheets 24a and 24b so that they overlap in a reliable manner with an overlapping edge between first receiver medium sheet 24a and second receiver medium sheet 24b located in a position that will be covered by inter-window area 136 of masking system 118 and so that window areas and image receiving areas are properly aligned.

For example, a consumer who purchases framing system 100 of FIGS. 8A and 8B and who requests that system 20 generate the first receiver sheet 24a and second receiver sheet 24b can assemble the combination project simply by positioning a reference edge 161 of first receiver sheet 24a against positioning feature 108 to ensure that it is properly aligned laterally with masking system 118 and can then position a reference edge 165 of second receiver sheet 24b against positioning feature 110 to ensure that second receiver sheet 24b is aligned laterally with both masking system 118 and with first receiver medium sheet 24a. Optionally, additional positioning features can be used, for example, to align first receiver sheet 24a and/or second receiver medium sheet 24b with additional positioning features, such as positioning features 112 and/or 114.

The positioning features can comprise a pattern of positioning features 108, 110, 112, and 114 that are arranged in a perimeter around the light transmissive area comprising a first lateral positioning feature 108 positioned at a first lateral end of the perimeter about the light transmissive area and a second lateral positioning feature 110 positioned opposite from the first lateral positioning feature 108 at a second lateral end of the perimeter. The first receiver medium is positioned at a first lateral position that is determined by the first lateral positioning feature 108 and the second receiver sheet is positioned at a lateral position that is determined by the second lateral positioning feature 110.

Figure 9:
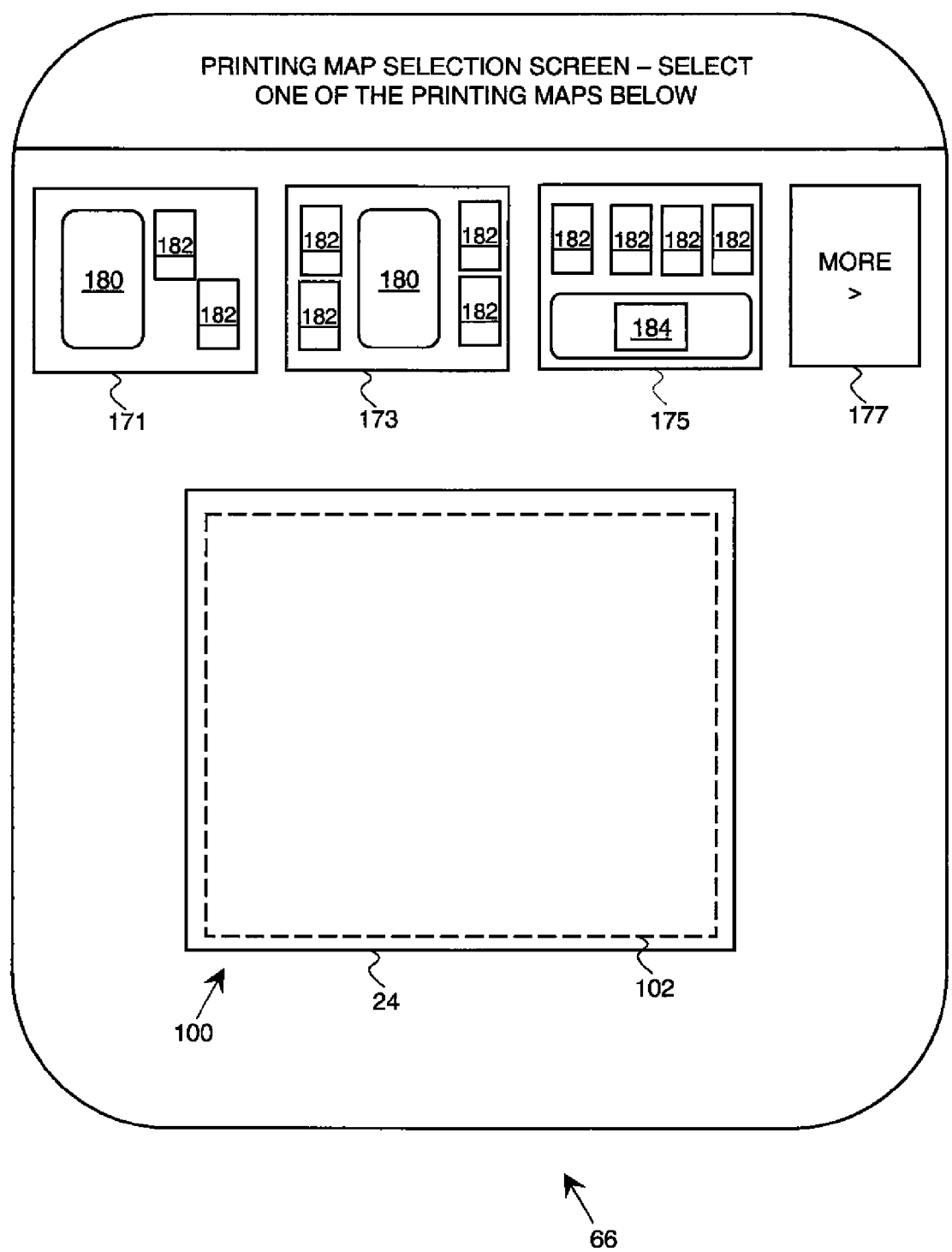
FIG. 9 shows a screen image presenting choices of printing maps.

In certain embodiments, more than one printing map may be available for use with any particular masking system 118. In such embodiments, system 20 can request that a user 72 make an input using user input system 26 to select a printing map from among the plurality of available printing maps. In one embodiment, illustrated in FIG. 9, a screen image displayed on display 66 presents a plurality of available printing maps 171, 173 and 175, that can be used with a framing system 100, as well as the option button 177 to seek additional printing map options.

Figure 10:
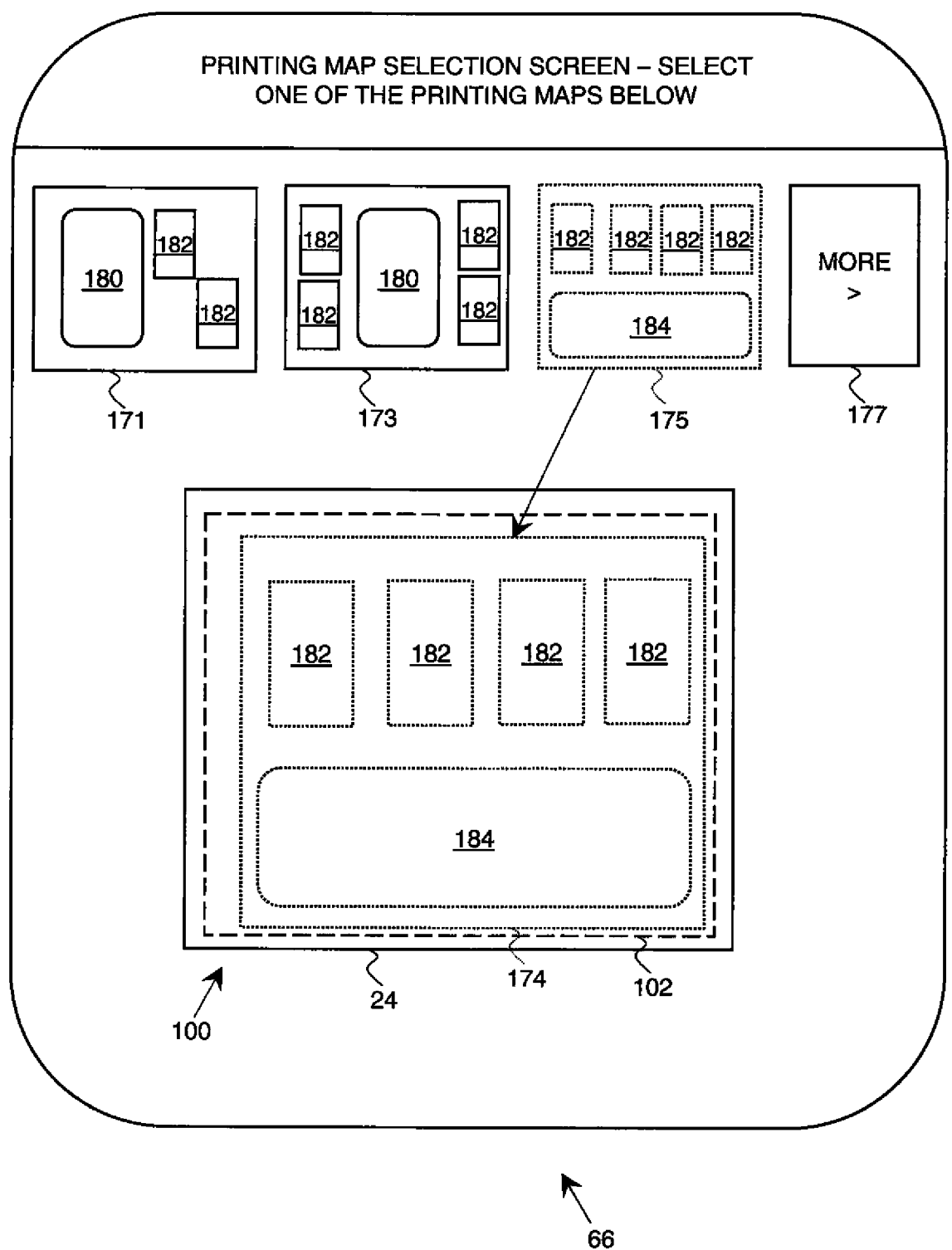
FIG. 10 shows a screen image of what is presented on a display when a selection has been made.

In the illustrated embodiment, printing map one 171 includes one large vertically oriented image 180 and two small images 182, while printing map two 173 includes one large vertically oriented image 180 and four small images 182. Printing map three 175 incorporates four small images 182 and one landscape or wide aspect ratio image 184. A user who is not satisfied with the selection of options can make a more options selection using, for example, button 177, which can obtain additional printing maps from those that may be associated with the image enhanced item. Where more than three printing maps are not available, the additional options button 176 can be omitted from presentation by system 20. As is illustrated in FIG. 10, a selection of one of the printing maps can be sensed by processor 34 and used to advise a user as to where or how the selected masking system 118 can be obtained. For example, the selected masking system 118 may be available as a commercial matte, or sold in a store or online for use with a specific sized frame.

It will be appreciated that in certain embodiments, the arrangement of receiver medium used for printing the images in the printing map need not provide a shape, size, or other configuration that is consistent with a shape, size or other configuration of the printing map. Instead, processor 34 can use a variety of different shapes, sizes, or configurations in the arrangement of the receiver medium used to enable printing of the images in the printing map without exposure of an overlapping edge in a window of the masking system 118.

Figure 11:
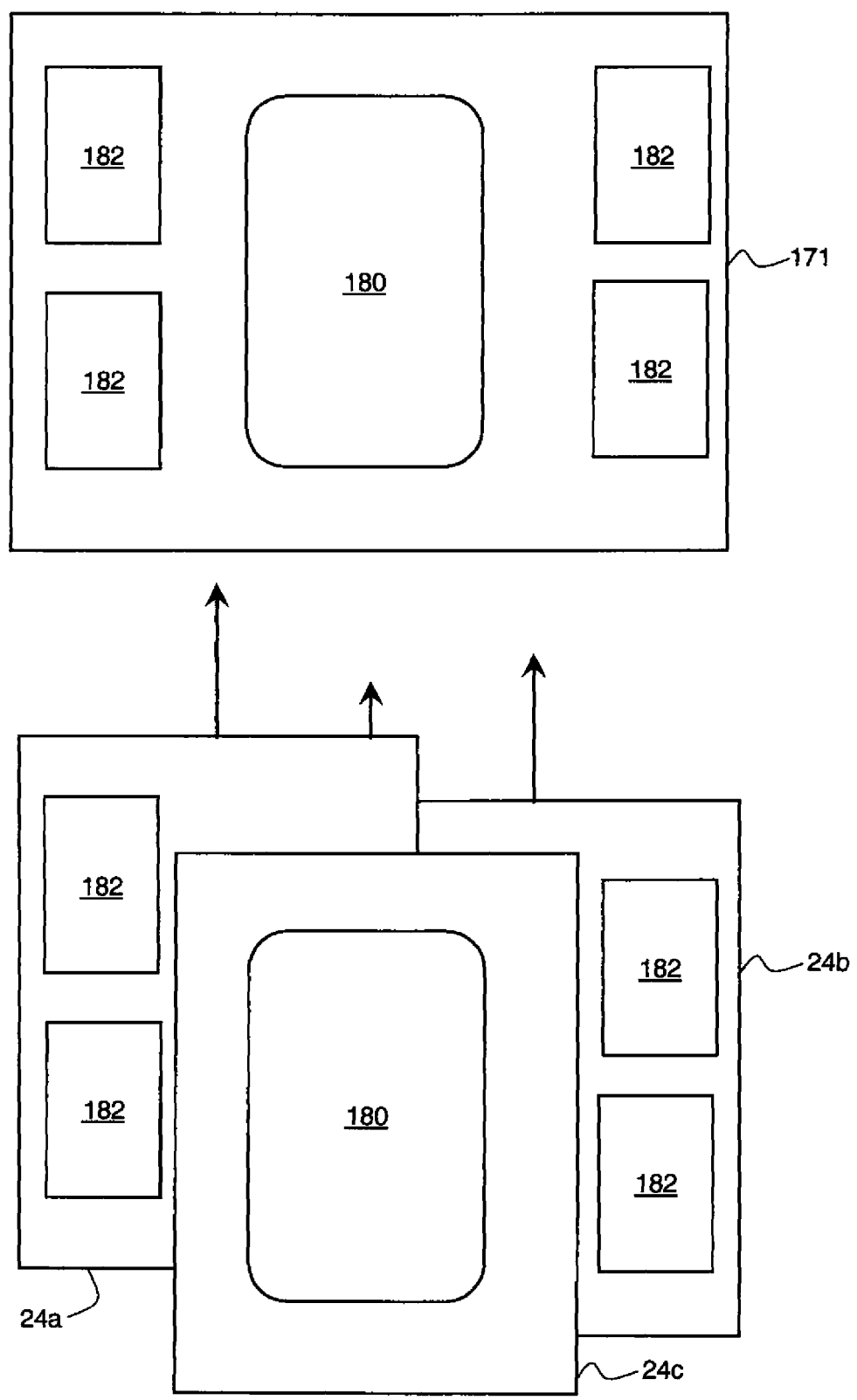
FIGS. 11 and 12 show examples of a different arrangement of receiver medium using three receiver mediums.
Figure 12:
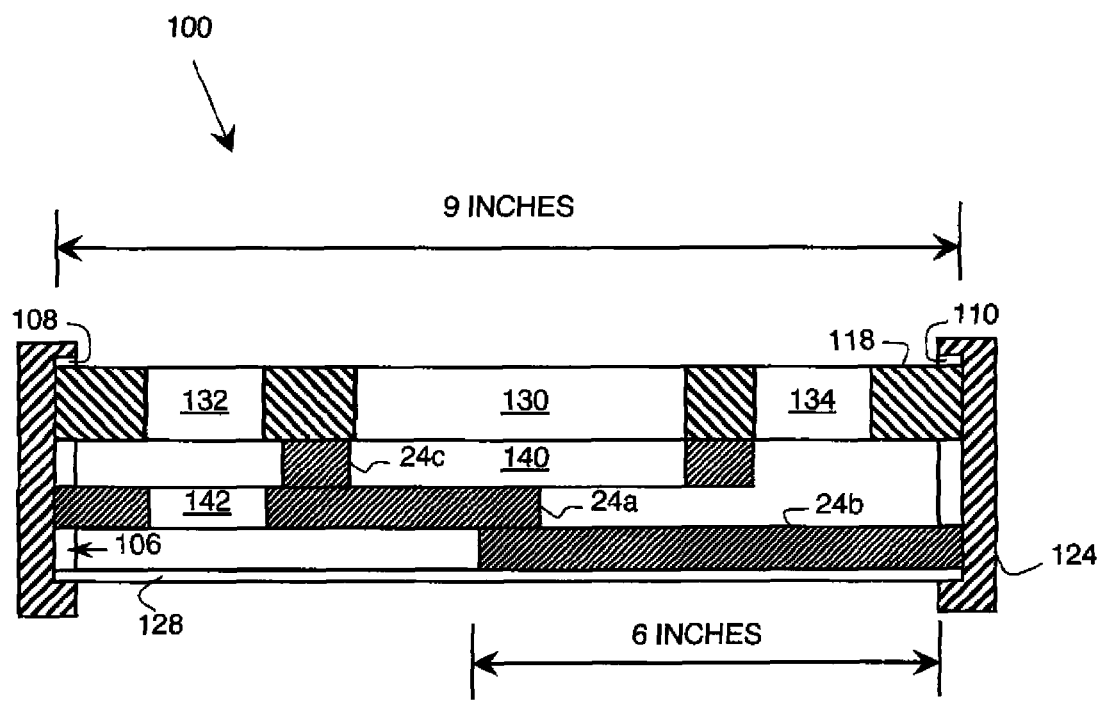

One example of different size arrangements and/or configurations is illustrated by the example of FIGS. 11 and 12. As is shown in FIG. 11, when a user 72 selects a printing map 173 for printing images for use with a corresponding masking system, processor 34 will determine that a single sheet of receiver medium 24a, 24b, or 24c cannot be used to receive the entire printing map. Accordingly, processor 34 determines an arrangement of a plurality of receiver mediums 24a, 24b, and 24c to receive small images 182 and large image 180.

As is shown in FIGS. 11 and 12, given the width dimensions of receiver mediums 24, it is not possible to completely print large image 180 on either of a first receiver medium 24a or second receiver medium 24b without revealing an overlapping edge thereof. Since this condition is not acceptable, processor 34 then examines whether large image 180 can be recorded on a third receiver medium 24c while still masking any overlapping edge of third receiver medium 24c under an inter-image area 136. When processor 34 determines that this is possible, processor 34 proceeds as described above to generate a first printing sub-map and a second printing sub-map and further determines a third printing sub-map. The third printing sub-map is determined in the same fashion described above with respect to the first printing sub-map and second printing sub-map. A first receiver medium 24a, second receiver medium 24b, and third receiver medium 24c are printed in accordance with the first printing sub-map, second printing sub-map, and third printing sub-map, respectively.

It will be appreciated from this that processor 34 can use any potential number of receiver mediums and any potential number of printing sub-maps to provide image receiving areas for each of the images of a selected receiver medium so long as these receiver mediums can be positioned within framing system 100 such that any overlapping edges are masked by masking system 118. The overlap of the edges can be in a horizontal direction, a vertical direction, or angled. Where three or more receiver mediums are utilized, each set of two receiver mediums can overlap in the same or different orientation as any other set of two receiver mediums.

Figure 13:
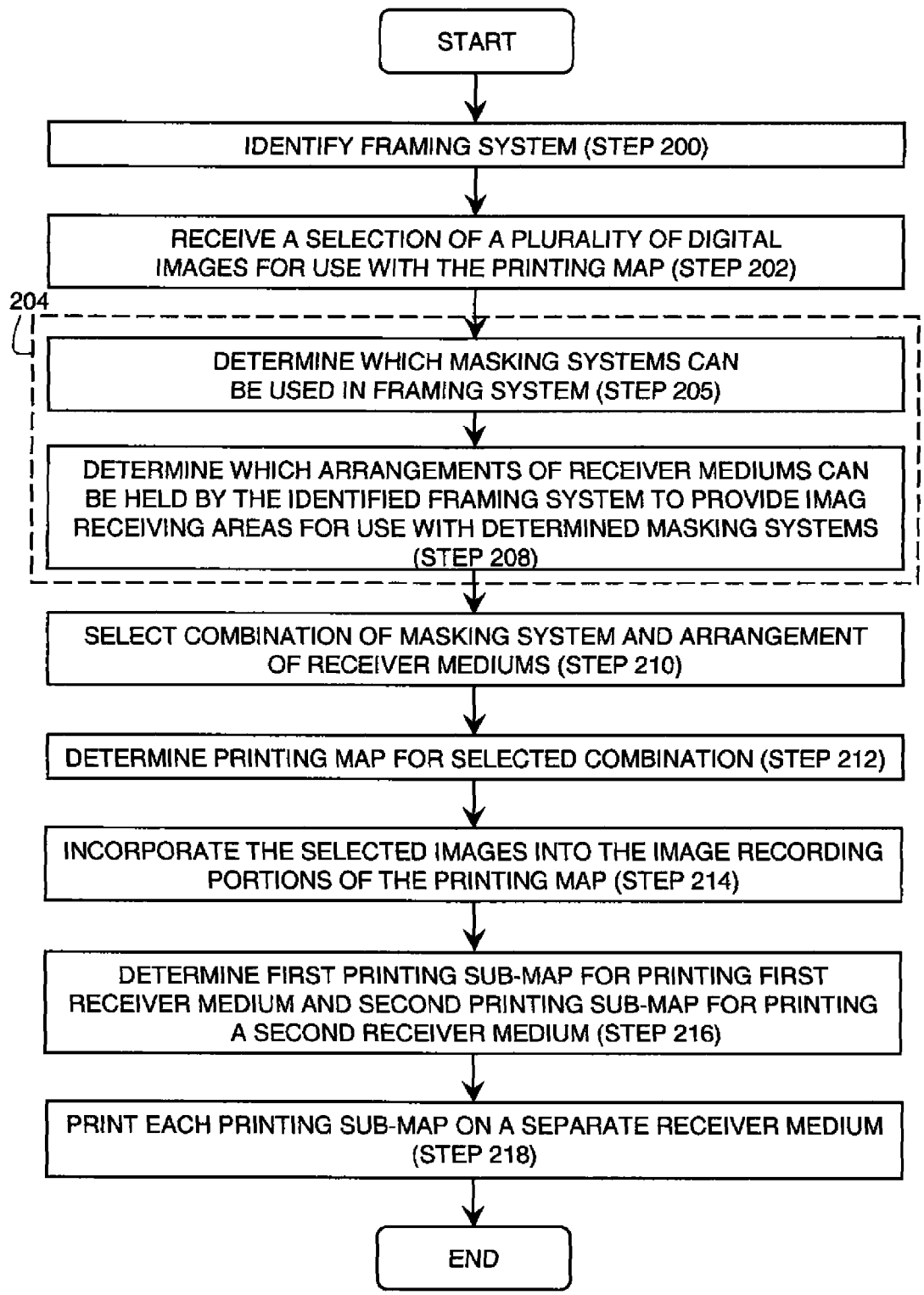
FIG. 13 shows a flow chart depicting another embodiment of a method for operating a printing system.

FIG. 13 illustrates yet another embodiment of a method for operating a printing system 20. In this embodiment, processor 34 is given the opportunity to help in the selection of masking system 118. As is illustrated in this embodiment, a framing system is identified (step 200) having a light transmissive area that is adapted to allow light to enter into and to exit from a holding area and a holding area that can hold any of a plurality of differently windowed masking systems in registration with the light transmissive area. The holding area is further adapted to hold a plurality of receiver mediums in positions that are at least defined in part with reference to a plurality of positioning features. It will be assumed for the purposes of discussion here that the identified framing system is one that requires multiple receiver mediums.

A user 72 then provides a selection of images for placement in the framing system (step 202), which can be done as is generally discussed above or in any conventional fashion.

Processor 34 then determines at least one combination of one of a plurality of potential masking systems 118 and one of a plurality of possible arrangements of overlapping receiver mediums that can be held by the framing system 100 (step 204). In the embodiment that is illustrated in FIG. 13, processor 34 first identifies which of a plurality of available masking systems 118 can be held by framing system 100. Processor 34 then evaluates which of the identified masking systems can be used to present the selected images (step 206). Often, this will involve selecting only masking systems 118 that provide a number of windows that is equivalent to the number of the identified images. However, this is not necessarily so as certain masking systems 118 can have windows that are patterned in a manner that can be used to present multiple images in one window, or a single image across multiple windows. Processor 34 can identify such masking systems 118 based upon stored data associated with the masking system or based upon analysis of data depicting masking system 118, such as an image thereof.

After identifying possible masking systems, processor 34 then determines arrangements of receiver mediums that can be held by framing system 100 in a manner that can provide image receiving areas for each of the identified images and that positions each overlapping edge of adjacent receiver mediums in the arrangement in positions that will be masked by an inter-window area 136 of a masking system with which they are combined (step 208).

In some cases, only one combination of masking system 118 and arrangement of a plurality of receiver mediums may be possible. Where this occurs, the possible combination can be presented to the user 72 of system 20 and the user can be allowed to accept or reject such a combination. However, in most cases, a selection from among a plurality of identified combinations will be required. Such a selection can be made manually or automatically.

In the manual mode, the available options are presented to a user 72 who, in any conventional fashion, can use user input system 36 to take a user input action that will cause a signal to be sent to processor 34 from which processor 34 can determine that the user has made a selection from among the combinations.

Figure 14:
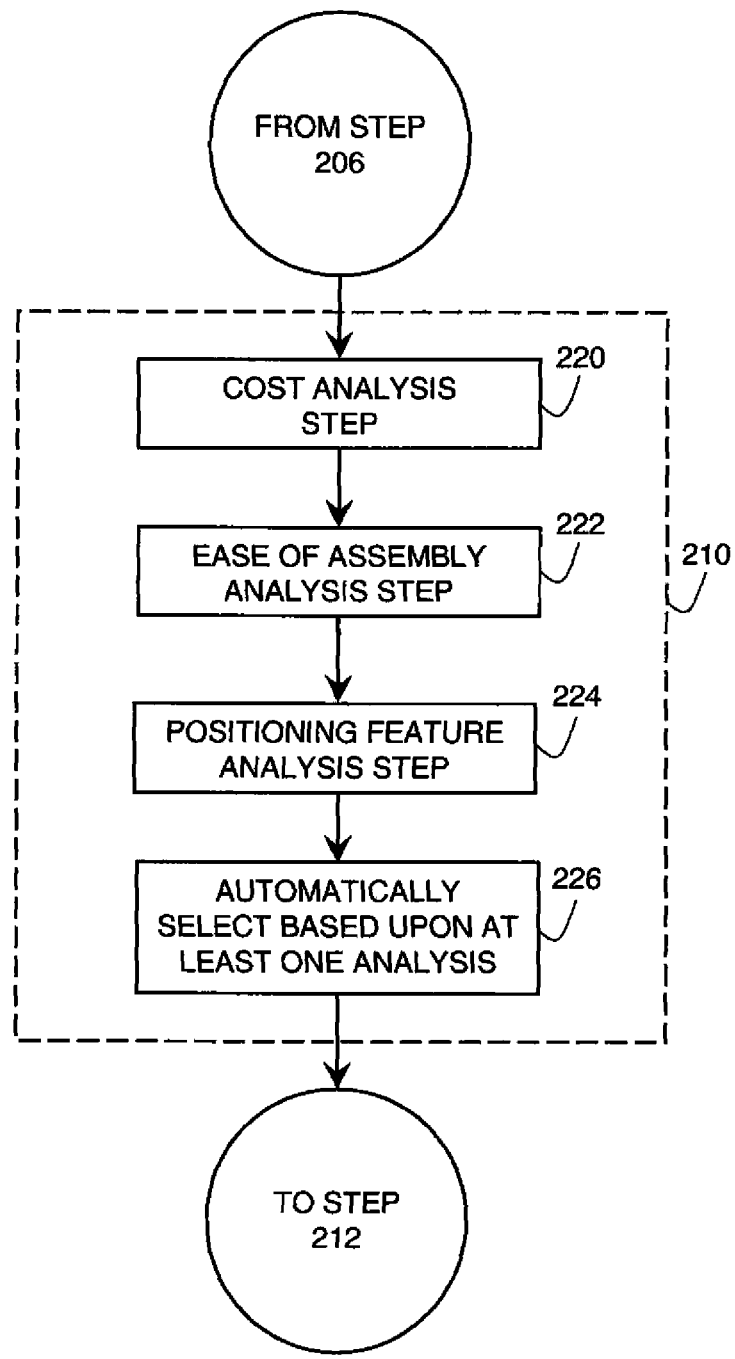
FIG. 14 shows various analyses that can be used to enable automatic selection of a combination of a masking system arrangement of receiver mediums for use in framing system 10.

In the automatic mode, processor 34 can use any of a plurality of threshold criteria in making a decision to select from a plurality of different combinations. As shown in FIG. 14, one criterion is the cost of the item. That is processor 34 can automatically analyze the costs associated with potential combinations with an emphasis on reducing the overall cost combination of either or both of the masking system 118 or the receiver mediums used in the combination (Step 220). For example, processor 34 can at a first level be adapted to analyze the combinations to select combinations that use a reduced overall number of receiver mediums 24 that must be printed to satisfy the requirements of the framing system 100 and masking system 118. Further, the costs associated with a particular masking system 118 can also be considered.

Similarly, case of assembly can be a factor in certain circumstances and, accordingly, processor 34 can analyze the difficulty of assembly of a particular combination and can use this analysis as a factor in selecting a particular combination of masking system 118 and receiver medium 120 (step 222). This is particularly so where framing system 100 has an irregularly defined light transmissive area 126 or where masking system 118 has an irregular shape, or where the positioning features do not readily facilitate assembly of the receiver mediums of the arrangement into area 106. In such circumstances, it may be easier to assemble the product using more than two receiver mediums, such as where the use of more than two receiver mediums 24 can avoid arrangements of receiver mediums that are at non-orthogonal angles or that are all assembled in an aligned fashion. Here too, processor 34 can optionally exhibit a preference for arrangements that are more easily assembled even at the expense of requiring additional printing operations. This adaptation can be made based upon a user input, user preferences, preprogrammed preferences, or the like.

The arrangement of positioning features of framing system 100 can be analyzed and used as a factor in selecting combinations of masking systems 118 and arrangements of receiver mediums 24 (step 224). For example, the arrangement of positioning features in framing system 100 can be used a basis for using more than a minimum number of receiver mediums. For example, the distribution of positioning features in framing system 100 can be compensated for by adjusting the number of receiver mediums that are used to satisfy the printing requirements above a minimum number of receiver mediums. Typically such an arrangement will be known based upon information that can be obtained from the above described framing system identification.

Processor 34 further can be adapted to analyze different orientations of the arrangements of receiver mediums 24 (step 228) such as between landscape and portrait orientations as such orientation differences may reduce the number of receiver mediums, make assembly easier, or may better align with the distribution of images or window areas and therefore impact the above described analyses.

Processor 34 can use such analyses to reduce the number of available options to a single combination that can be automatically selected or a reduced number of combinations that can be presented to a user 72 so that user 72 can make a selection from a reduced set of options.

It will be appreciated that once the masking surface 118 and the arrangement of receiver mediums is determined, a printing map can be determined in the manner that is described in greater detail above (step 212). Printing sub-maps can be determined for each receiver medium based upon the printing map (step 214). The printing sub-maps can be defined relative to reference edges of the receiver mediums such that each receiver medium in the arrangement can be properly aligned with other receiver mediums in the arrangement by positioning a reference edge of the receiver medium with respect to a different one of a plurality of positioning features in framing system 100.

The selected images are incorporated into the image recording portions of the printing map (Step 214) and the printing sub-maps so determined (Step 216) can be used for printing individual receiver mediums to be used in the arrangement of receiver mediums (Step 218).

Figure 15:
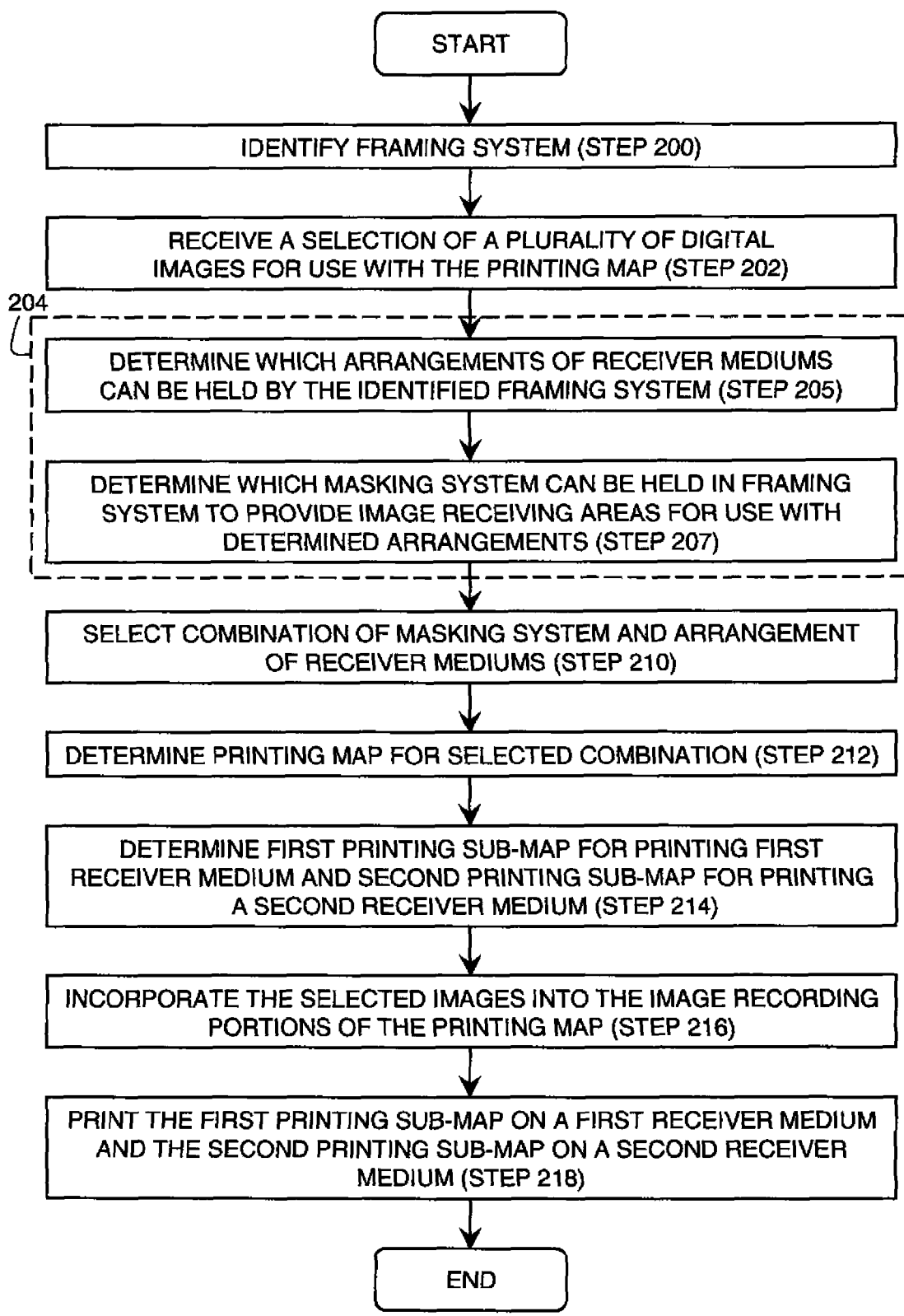
FIG. 15 shows another flow chart depicting another embodiment of a method for operating a printing system.

FIG. 15 shows another embodiment of the step 204 of identifying at least one combination of possible masking systems and associated arrangements of receiver medium sheets with the identification being made to cause any edge between any two overlapping receiver medium sheets to be positioned outside of the window areas of the associated masking surface when the receiver mediums are placed in the holding area with reference edges thereof positioned relative to different ones of the plurality of positioning features. Specifically, in this embodiment, identifying step 204 is performed by first determining an arrangement of receiver mediums that can be held by the identified framing system (step 205) and then determining which of a plurality of masking system can be used in the framing system to provide image receiving areas for use with the determined arrangement of receiver mediums (Step 207).

In one embodiment, processor 34 can determine one or more arrangements of a plurality of overlapping receiver medium sheets that are arranged to provide a plurality of image receiving areas that will provide full coverage of the light transmissive area when a reference edge of each of the receiver medium sheets is positioned relative to an associated one of the positioning features. This approach requires that the arrangements that are used cover all potential areas in which images can be located. Such an arrangement will typically be constructed to reduce the possibility that an overlapping edge of the receiver mediums will interfere with preferred placements of image receiving areas or preferred masking systems 118.

The arrangement of receiver mediums 24 can also be determined based upon the size and shape and other characteristics of the framing system, including for example and without limitation, the size and shape of light transmissive area 104 and the arrangement of positioning features in framing system 100 such that the arrangement of receiver mediums allows each receiver medium 24 to be positioned with reference to at least one positioning feature of framing system 100.

After this determination is made, masking systems 118 can be selected for use with each arrangement of receiver mediums 24 based, for example, upon the number of images and the requirement that any overlapping edges of the receiver mediums be masked by masking system 110 (step 207). Here too, the selection of masking system 118 for use with any arrangement of receiver mediums is made so as not to cause any edge between any two of the plurality of overlapping receiver medium sheets to be positioned in of the window areas of the masking surface when each receiver mediums is placed in the framing system with its respective reference edge positioned relative to the positioning feature that is associated therewith, and when the masking surface is placed in the framing system with a reference edge thereof positioned relative to a masking surface positioning feature.

Processor 74 then selects at least one combination of possible masking systems and associated arrangements of receiver medium sheets with the identification being made to cause any edge between any two overlapping receiver medium sheets to be positioned outside of the window areas of the associated masking surface when the receiver mediums are placed in the holding area with reference edges thereof positioned relative to different ones of the plurality of positioning features. This can be done as generally described above with reference to selecting step 210.

The processor is further adapted to select one of the plurality of combinations of masking systems and associated arrangements of receiver medium sheets and to record images on the plurality of receiver medium sheets so that such images are aligned with the window areas of the selected masking system when the receiver mediums are placed in the holding area with the reference edges of the receiver mediums positioned relative to different ones of the plurality of positioning features provided by framing system 100.

It will be understood that in some instances, a printing system 29 will be capable of printing using different sized or shaped receiver mediums 24. Where this is possible, steps of determining arrangements of receiver mediums, e.g. step 205 or 206, can be performed in a manner that considers whether various combinations of differently sized receiver mediums can advantageously be used to provide an arrangement of two or more overlapping receiver mediums that can be held by framing system 100 to provide image receiving areas that correlate to windows of a masking system 118. Similarly the various analysis steps such as the cost analysis step 220, the ease of assembly analysis step, the positioning feature analysis step 224, and the orientation analysis step 226, can be performed with due consideration of the possibilities presented by the availability of such other sized receiver mediums, so long as the use of such differently sized receiver mediums 24 otherwise can be used in the manner that is described generally herein.

It will be appreciated that such outcomes greatly facilitate the generation of a framed image product of a size or shape that does not conform to conventional sizes and or shapes of various receiver mediums that are commonly generated by printers and the like, but without the requirement that the images that are printed require particular image sizes and/or aspect ratios.

The invention has been described in detail with particular reference to certain preferred embodiments thereof, but it will be understood that variations and modifications can be effected within the spirit and scope of the invention.

PARTS LIST 20 electronic system
21 housing
22 data files
24 receiver medium
24a and 24b overlapping receiver mediums
26 user input system
28 output system
29 printer
34 processor
38 sensor
39 audio sensors
40 memory
42 hard drive
44 disk drive
46 removable memory card
48 removable memory
52 remote memory system
54 communication system
56 remote display
58 remote input
58a remote keyboard
58b remote muse
58c remote control
66 local display
68 local input control
68a local keyboard
68b mouse
70 kiosk
72 user
95 printing map
97 first printing sub-map
99 second printing sub-map
100 framing system
102 external structural frame
104 light transmissive area
106 internal area
108, 110, 112, and 114 edges
108, 110, 112, and 114 positioning features
118 masking system
128 optional backing support
130, 132, and 134 windows
136 inter-window area
140, 142, and 144 portions
140A, 140B, 142 and 144 image
150 tote bag
151 substrate
152 masking system
154, 156, and 158 window areas
160, 162 and 164 attachment stitches
161, 165 reference edge
162, 163 overlapping edge
170 first printing sub-map
171, 173 and 175 printing maps
172 second printing sub-map
174 first printing sub-map
176 second printing sub-map
177 option
180 vertically oriented image
182 small images
184 ratio image

The invention claimed is:

1. A computer implemented method for printing digital images, the method comprising the steps of:
receiving an identification of a framing system, the framing system comprising:
a receiving region for receiving a plurality of print media, each having at least one digital image printed thereon and at least one of the print media having at least two digital images printed thereon,
positioning features for positioning each of the plurality of print media in the receiving region; and
a plurality of openings such that when the plurality of print media is received in the receiving region the digital images printed thereon are each viewable within one of the openings, provided that the plurality of print media are aligned in the receiving area according to predetermined positions and the digital images are printed at predetermined locations on the plurality of print media;
determining a print map for printing the plurality of digital images at the predetermined locations on the plurality of print media such that:
the print media overlap, thereby defining an overlap region;
each of the digital images are viewable in one of the openings when a reference edge of each of the plurality of print media are aligned in accordance with the predetermined positions using the positioning features; and
the overlap region is disposed outside of the openings;
wherein the print map defines a print area on each of the print media including dimensions of the digital images on each of the print media, and defines the predetermined locations on the plurality of print media to print the plurality of digital images; and
printing the digital images at the predetermined locations on the plurality of print media.

2. The method of claim 1, wherein the plurality of print media have a combined aspect ratio that is different than an aspect ratio of any one of the print media.

3. The method of claim 1, wherein each of the plurality of print media has a different aspect ratio than another one of the plurality of print media.

4. The method of claim 1, wherein the step of printing comprises printing the digital images at the predetermined locations on the plurality of print media using only one printer.

5. The method of claim 1, wherein the step of printing comprises printing the digital images at the predetermined locations on the plurality of print media using two or more printers.

6. A computer implemented method for framing images comprising the steps of:
printing a plurality of digital images on a plurality of print media according to a print map generated by the computer, each of the print media having at least one of the plurality of digital images printed thereon and at least one of the print media having at least two digital images printed thereon, the print map defining locations on the plurality of print media to print the plurality of digital images and defining an overlap area wherein the print media overlap;

providing a framing system for displaying the plurality of printed digital images on the plurality of print media, the framing system including:

a receiving region for receiving and holding the plurality of print media, wherein the plurality of print media overlap according to the overlap area;

positioning features for aligning the plurality of print media in the receiving region; and a plurality of openings such that when the plurality of print media are received in the receiving region, and aligned with the positioning features, the digital images printed thereon according to the print map are each viewable within one of the openings and the overlap area is disposed outside of all the plurality of openings.

7. The method of claim 6, wherein the plurality of print media have a combined aspect ratio that is different than an aspect ratio of any one of the print media.

8. The method of claim 6, wherein each of the plurality of print media has a different aspect ratio than another one of the plurality of print media.

9. The method of claim 6, further comprising printing the digital images on the plurality of print media according to the print map using only one printer.

10. The method of claim 6, further comprising printing the digital images on the plurality of print media according to the print map using two or more printers.

* * * * *